United States Patent [19]

Baird

[11] 4,337,663
[45] Jul. 6, 1982

[54] DEVICE FOR TESTING THE SUCTION STRENGTH OF AN UPRIGHT VACUUM SWEEPER

[76] Inventor: Thomas E. Baird, 2132 N. 24th St., Springfield, Ill. 62702

[21] Appl. No.: 198,808

[22] Filed: Oct. 20, 1980

[51] Int. Cl.³ .............................................. G01L 7/00
[52] U.S. Cl. ..................................................... 73/700
[58] Field of Search ........................... 73/700, 432 R; 15/257 A, 235.4

[56] References Cited

U.S. PATENT DOCUMENTS 2,189,555  2/1940  Stabbert ............................. 15/235.4

FOREIGN PATENT DOCUMENTS 1460590  10/1966  France ............................... 15/235.4

Primary Examiner—Donald O. Woodiel
Attorney, Agent, or Firm—Ralph F. Staubly

[57] ABSTRACT

An elongated thin flat hard-plastic plate has a face sized to overlie and seal the rug nozzle of an energized inverted upright vacuum sweeper for testing and demonstrating the suction strength of the sweeper. The sheet is desirably provided (1) with depending marginal flanges to prevent its lateral sliding-off the nozzle, and (2) with upstanding ribs on its upper surface to rigidify the sheet and to form a block-shaped centrally located handle grip.

4 Claims, 2 Drawing Figures

DEVICE FOR TESTING THE SUCTION STRENGTH OF AN UPRIGHT VACUUM SWEEPER

BACKGROUND AND OBJECTS OF THE INVENTION

It is known to test the suction strength of an energized upright vacuum sweeper by inverting it, and by laying a piece of cardboard over its rug nozzle for testing by vertical lifting. But it is not known to construct a tester which (1) is light-weight for easy handling and for economy of manufacture, (2) is rigidified by integral upstanding ribs to prevent test-defeating edge bending, (3) has marginal flanges to prevent lateral displacement, and (4) has a smooth-sided block-shaped handle to prevent a too-firm removal grip thereon. It is the principal object of this invention to provide such a tester.

BRIEF DESCRIPTIONS OF THE DRAWING FIGURES

DETAILED DESCRIPTION

Figure 1:
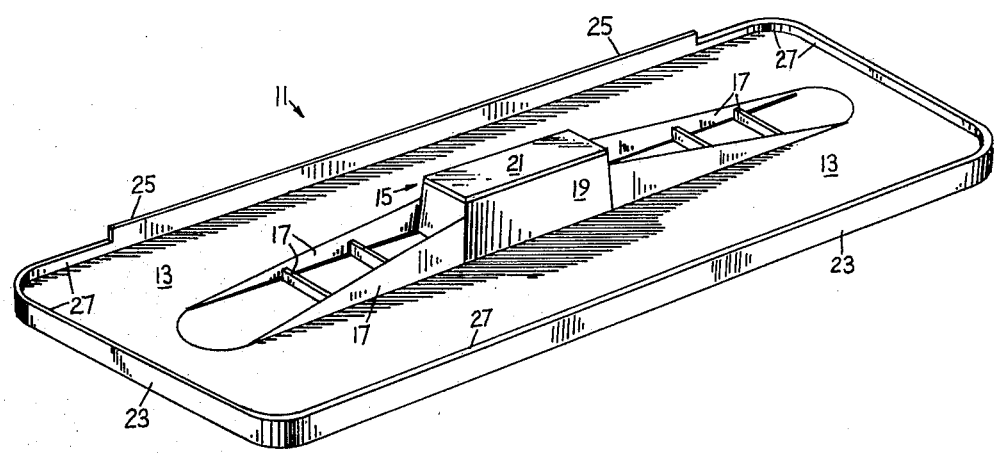
FIG. 1 is a perspective view of a preferred embodiment of the invention.
Figure 2:
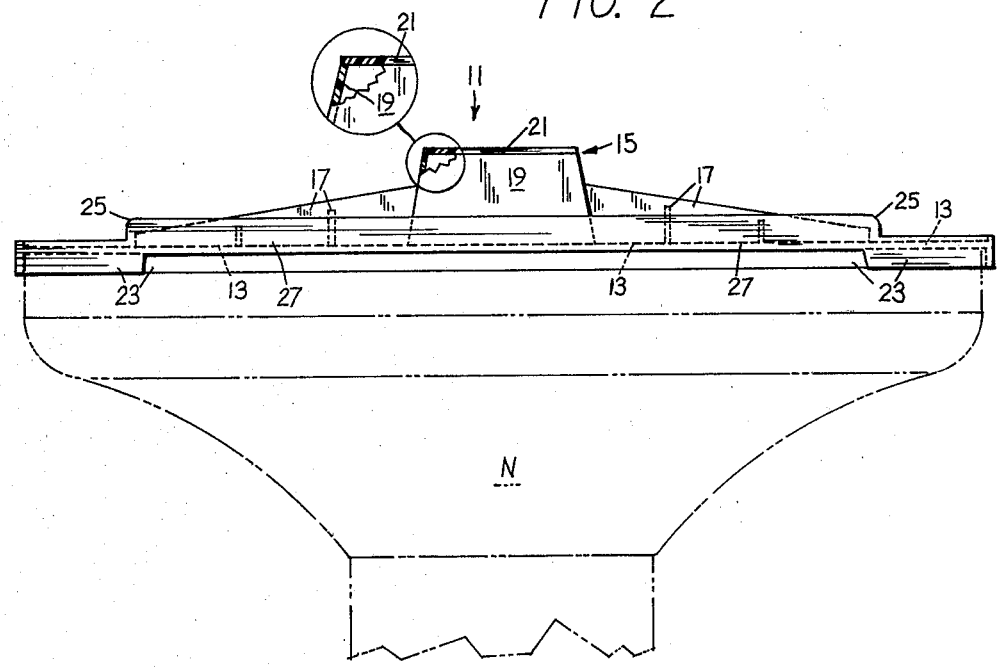
FIG. 2 is a side elevational view of the device of FIG. 1 taken from the left and rear of FIG. 1.

With reference now to the drawings, the numeral 11 generally designates the tester, which comprises basically a thin flat hard-plastic plate 13 and a centrally located handle grip 15. The plate 13 is rigidified by integrally molded upstanding ribs 17. The handle-grip 15 is likewise molded of panels 19 defining a hollow smooth-sided box, which optionally can have a cemented-on cover 21.

The plate 13 has short depending marginal flanges 23 around most of its perimeter to prevent lateral displacement of the tester from the sweeper nozzle N. Where the flanges 23 are omitted to accomodate interferring nozzle structure, extra height 25 is added to the reinforcing rim 27.

The invention having been described, what is claimed is:

1. A device for testing the suction strength of an energized inverted upright-type vacuum sweeper, comprising: a relatively rigid flat plate of a size to sealingly cover the rug nozzle of said inverted upright-type vacuum sweeper, and a centrally attached lifting handle having smooth vertically disposed gripping surfaces thereon, said handle and said plate being integrally molded from plastic material.

2. A device according to claim 1 wherein said plate is relatively thin and is rigidified by integrally molded upstanding ribs.

3. A device according to claim 3 wherein certain of said ribs also define said handle with a hollow interior.

4. A device according to claim 1 wherein said plate has depending short marginal flanges to prevent lateral displacement from said nozzle.

* * * * *